June 30, 1964  E. W. BOTTUM  3,139,103
FUSIBLE PLUG
Filed Jan. 15, 1962

INVENTOR.
EDWARD W. BOTTUM
BY
WILSON, SETTLE & CRAIG
ATTORNEYS

United States Patent Office 3,139,103
Patented June 30, 1964

3,139,103
FUSIBLE PLUG
Edward W. Bottum, 9357 Spencer, Brighton, Mich.
Filed Jan. 15, 1962, Ser. No. 166,278
1 Claim. (Cl. 137—72)

This invention relates to a fusible plug, and more particularly to a fusible plug for use in refrigeration receivers.

A fusible plug consists of a plug body having an axial opening therethrough which is sealed with a fusible eutectic alloy. The alloy is adapted to melt at a specified temperature to open the plug and permit the escape of high pressure gas therethrough. Such plugs are used in closed refrigeration systems as safety devices to prevent the explosion of system components as a result of extremely high pressures of the refrigerant in the system. The normal cause of high refrigerant pressure is increased temperatures resulting from a fire in the building in which the refrigeration system is installed.

It has been common practice for many years to provide fusible plugs in refrigeration components where large amounts of refrigerant are collected such as receivers and accumulators. Conventionally, such plugs have been machined brass fittings with axial openings filled with a fusible alloy which will melt at the correct temperature (for example, from 150° to 367° F.). Such conventional plugs are externally threaded with pipe threads and are threadingly received by female pipe threads provided in an opening in the refrigeration component.

It has been difficult to prevent such conventional plugs from leaks permitting the escape of refrigerant. One cause of leaks has been the poor seal at the pipe threads. It is difficult to provide a satisfactory seal at the threads. Sealing compounds have not been effective because high pressure refrigerants can rupture the seal formed by such compounds. Attempts to use "dry seal" thread standards has also proved to be unsatisfactory. "Dry seal" threads are designed to be very close fitting to provide a tight engagement. The concept is that the male threads will bite into the female threads and seal the thread connection. However, the center of the fusible plug is filled with a soft metal and when pressure is applied to the plug, considerable distortion of the soft metal takes place. The fusible metal tends to cold flow axially under pressure, permitting the male threads to collapse instead of biting into the female threads. As a consequence, a leak often exists at the threads as a result of low outward radial pressure. Distortion of the soft alloy also often causes leaks through or around the alloy. Frequently, these leaks are very small and do not evidence themselves until the plug has been in use for some time. This presents a costly maintenance problem.

This problem is solved according to the present invention by the provision of a fusible plug in which such leaks are virtually eliminated. The plug is further improved in that it is simple to install and replace.

It is an object of the invention to provide an improved fusible plug for refrigeration systems.

A further object of the invention is to provide a fusible plug having external threads engageable with a threaded opening in a refrigeration component the plug having a tapered inner end to engage a flare gasket to form a tight seal with said opening.

Another object of the invention is to provide a fusible plug having a plug body with a first threaded portion, a second wrench engageable portion and a third portion forming an extension from said first two portions so as not to be subject to the stresses involved in threading the plug into a threaded opening.

Another object of the invention is to provide a fusible plug having one end closed by a rivet which is sealingly secured to the plug by a fusible alloy, the rivet occupying most of the space of the opening, thus permitting the use of only small amounts of the fusible alloy to thereby reduce the manufacturing cost in terms of material and time.

Other objects of this invention will appear in the following description and appended claims, reference being had to the accompanying drawing forming a part of this specification wherein like reference characters designate corresponding parts in the several views.

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

Figure 1:
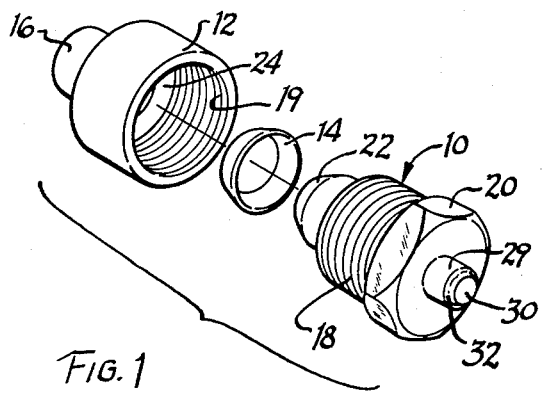
FIGURE 1 is an exploded view of one embodiment of the fusible plug and an associated fitting of the present invention.
Figure 2:
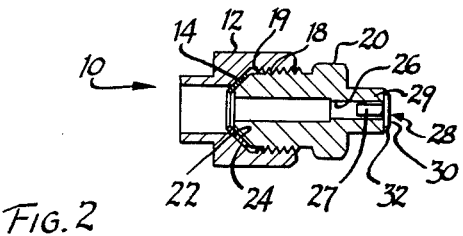
FIGURE 2 is a side elevational sectional view of FIGURE 1 assembled in position.

Referring to FIGURES 1 and 2, it may be seen that the fusible plug 10 is received in a fitting 12, the joint being sealed by a flare gasket 14. The reduced diameter end 16 of the fitting 12 is suitably attached to a refrigeration component (not shown) such as a receiver or accumulator in which explosive quantities of refrigerant may be present.

The plug 10 is provided with an externally threaded portion 18 and a wrench engageable head 20 for threading the plug into the threads 19 of the fitting 12. The inner end 22 of the plug is of reduced diameter and tapered to register with the conical flare gasket 14. The gasket 14 is preferably fabricated of copper to insure a fluid-tight seal. The fitting 12 has a tapered portion 24 to mate with the gasket whereby when the fitting and plug are threaded together, a tight seal will be formed by engagement with the gasket.

The plug 10 is formed with an axially extending opening 26 therethrough. The shank 27 of a rivet 28 is inserted into the opening 26 in the extension 29 at the outer end of the plug 10. The rivet 28 is held in place, and the opening 26 is sealed, by a fusible alloy 32 which extends around the periphery of the rivet head 30. The alloy 32 is of the low melting eutectic type which will melt at a specific temperature. As will be appreciated, when the temperature of the refrigerant in the system reaches the melting point of the alloy 32, the rivet 28 will conduct heat to the alloy, causing the alloy to melt. The pressure in the system will then force the rivet out of the plug, thus opening the plug for the escape of high pressure refrigerant.

It will be noted that the extension 29 has a relatively small mass. This is preferred for ease of filling and sealing with the alloy.

Figure 3:
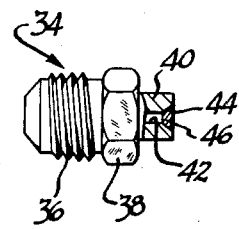
FIGURE 3 is a side elevational view of another embodiment of the invention, with a portion thereof shown in section for the purpose of clarity.

FIGURE 3 illustrates a second method for sealing the plug with a fusible alloy. In the FIGURE 3 embodiment, the plug 34 is provided with a threaded portion 36 and a wrench engageable head 38 as in the FIGURE 1 embodiment. An extension 40 projects from the head 38 and an axial opening 42 is provided entirely through the plug. The opening 42 is tapered at 44 and this tapered portion is filled with an alloy 46. Tapering of the opening assists in mechanically holding the alloy in place.

Figure 4:
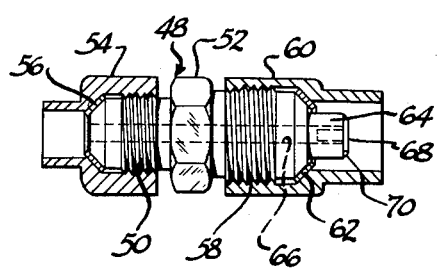
FIGURE 4 is a side elevational view of a modification of the fusible plug of FIGURE 1.

FIGURE 4 illustrates a modification of the FIGURE 1 plug. The plug 48 is provided with a threaded portion 50 and a wrench engageable head 52 for engagement with a fitting 54 which is in communication with a refrigeration component such as a receiver or accumulator. A flare gasket 56 is provided to seal this joint. A second threaded portion 58 is provided to threadingly engage a fitting 60, the joint being sealed by a flare gasket 62. An extension 64 projects from the threaded portion 58. An axial opening 66 is provided through the plug and is closed by a rivet 68 provided in the extension 64 and sealed by an alloy 70.

The fitting 60 is suitably attached to a conduit (not shown) which leads from the plug to a safe place for the exhaustion of refrigerant gases, for example, to the outside of the building in which the refrigeration system is installed. This arrangement provides for the safe exhaustion of toxic refrigerant gases.

Figure 5:
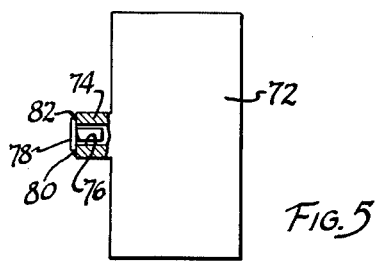
FIGURE 5 is a view of a refrigeration component having a fusible plug permanently mounted thereon and constructed in accordance with the present invention.

FIGURE 5 is illustrative of a plug construction forming a permanent part of a major refrigeration component. The component, represented by the casing 72, may be a receiver or accumulator in a large capacity refrigeration system. The plug body 74 is secured to the casing 72 as by welding. The body extends from the casing and has an axial opening 76 leading into the casing. A rivet 78 is provided in the outer end of the body 74 and is sealed in place by fusible alloy 80. Conventionally, permanent fusible plugs are provided on such structures by merely filling an opening in the structure with the fusible alloy. The present construction is advantageous in that the extension formed by the body 74 is well suited to efficient production techniques. When the alloy 80 is applied to the body 74, the heat involved, being isolated from the casing by the body 74, will not damage the casing. Additionally, the casing 72 may be inverted during the soldering operation and the body 74 pressed onto a felt pad containing the flux necessary for soldering. The flux is thus applied only around the outer surface 82 of the plug body and does not enter the casing through the opening 76. The solder can be applied by dipping the body 74 into a solder pot. One advantage of this construction resides in elimination of the possibility of inadvertently getting some of the flux into the casing 72. The acid in the flux causes a corrosion problem in the casing and leads to the premature deterioration of the refrigeration component.

It will be noted that in each of the modifications of FIGURES 1, 2, 3 and 4, that the fusible alloy is positioned on an extension which is beyond the point at which a wrench is applied during the threading of the plug into a fitting. Consequently, the alloy metal will not be distorted when the plug is installed. The plugs may be easily and quickly installed with practically no possibility of a leak, either through the fusible alloy or around the plug threads.

In the constructions shown, the plug has been provided with external threads. However, it will be appreciated that the structure may be reversed to provide internal threads on the plug for reception on a male refrigeration fitting.

Having thus described my invention, I claim:

A fusible plug comprising a plug body having an inner and an outer end; said plug body having an opening therethrough for communication with the interior of a closed refrigeration system; the inner end of the plug having a tapered wall portion for sealing engagement with a gasket; a threaded portion adjacent the inner end of the plug body for attachment with threaded structure of a refrigeration system; a rivet having a shank extending into said opening at the outer end, said rivet having a head abutting against the outer end; and a fusible metal alloy securing said head to the plug body and sealing the opening.

References Cited in the file of this patent
UNITED STATES PATENTS

| | | |
|---|---|---|
| 5,022 | Stillman | Mar. 20, 1847 |
| 768,384 | Lockwood | Aug. 28, 1904 |
| 2,431,110 | Clair | Nov. 18, 1947 |
| 2,786,537 | Wainess | Mar. 26, 1957 |